(12) United States Patent
Lanciaux (10) Patent No.: US 11,697,267 B2
(45) Date of Patent: Jul. 11, 2023

(54) CEILING PANEL FOR SUSPENDED CEILINGS

(71) Applicant: Fran Lanciaux, Grand Rapids, OH (US)

(72) Inventor: Fran Lanciaux, Grand Rapids, OH (US)

( * ) Notice: Subject to any disclaimer, the term of this patent is extended or adjusted under 35 U.S.C. 154(b) by 55 days.

(21) Appl. No.: 17/205,011

(22) Filed: Mar. 18, 2021

(65) Prior Publication Data

US 2021/0291492 A1    Sep. 23, 2021

Related U.S. Application Data

(60) Provisional application No. 62/991,136, filed on Mar. 18, 2020.

(51) Int. Cl.
| | |
|---|---|
| *B32B 15/04* | (2006.01) |
| *E04B 9/04* | (2006.01) |
| *B32B 15/20* | (2006.01) |
| *B32B 15/14* | (2006.01) |
| *B32B 5/02* | (2006.01) |
| *B32B 5/18* | (2006.01) |

(Continued)

(52) U.S. Cl.
CPC .............. *B32B 15/046* (2013.01); *B32B 5/02* (2013.01); *B32B 5/18* (2013.01); *B32B 7/027* (2019.01); *B32B 7/12* (2013.01); *B32B 15/14* (2013.01); *B32B 15/20* (2013.01); *E04B 9/0435* (2013.01); *B32B 2307/102* (2013.01); *B32B 2307/3065* (2013.01); *B32B 2607/00* (2013.01); *E04B 2103/04* (2013.01); *E04B 2103/06* (2013.01)

(58) Field of Classification Search
CPC ....... B32B 13/14; B32B 15/046; B32B 15/14; B32B 15/20; B32B 19/06; B32B 2250/04; B32B 2255/02; B32B 2255/10; B32B 2262/10; B32B 2262/101; B32B 2262/103; B32B 2266/0285; B32B 2266/08; B32B 2307/102; B32B 2307/306; B32B 2307/3065; B32B 2307/7246; B32B 2307/732; B32B 2419/00; B32B 2607/00; B32B 27/12; B32B 3/02; B32B 3/06; B32B 3/08; B32B 5/02; B32B 5/028; B32B 5/18; B32B 5/245; B32B 5/26; B32B 7/027; B32B 7/12; B32B 9/005; B32B 9/047; E04B 2103/04; E04B 2103/06; E04B 9/0435; E04B 9/045; E04B 9/241; E04B 9/28

See application file for complete search history.

(56) References Cited

U.S. PATENT DOCUMENTS

| | | | | |
|---|---|---|---|---|
| 4,486,995 | A | * | 12/1984 | Allen ...................... E04C 2/284 52/309.8 |
| 4,885,889 | A | * | 12/1989 | Hemphill .................. E04B 9/04 52/506.06 |

(Continued)

*Primary Examiner* — Hai Vo
(74) *Attorney, Agent, or Firm* — C. Fred Charpie, III; Ward Law Office LLC (57) ABSTRACT

A ceiling panel for use in a gridwork of a suspended ceiling is provided. The ceiling panel includes a layer of foam insulation. A first facing sheet is positioned on a lower major face of the layer of foam insulation and a second facing sheet is positioned on an upper major face of the layer of foam insulation. A surface covering layer is positioned on an exposed face of the first facing sheet.

17 Claims, 5 Drawing Sheets

FIG. 2

(51) Int. Cl.
*B32B 7/027* (2019.01)
*B32B 7/12* (2006.01)

(56) References Cited

U.S. PATENT DOCUMENTS

| | | | | |
|---|---|---|---|---|
| 6,487,822 | B1* | 12/2002 | Haack | E04B 9/0471 |
| | | | | 181/290 |
| 2007/0059516 | A1* | 3/2007 | Vincent | C09D 5/185 |
| | | | | 428/319.1 |
| 2012/0225236 | A1* | 9/2012 | Cox | E04B 1/24 |
| | | | | 428/58 |
| 2014/0271972 | A1* | 9/2014 | Lanciaux | B32B 3/30 |
| | | | | 425/388 |
| 2015/0204065 | A1* | 7/2015 | Lotti | B32B 5/26 |
| | | | | 428/319.1 |

\* cited by examiner

CEILING PANEL FOR SUSPENDED CEILINGS

RELATED APPLICATIONS

This application claims the benefit of U.S. Provisional Patent Application No. 62/991,136, filed Mar. 18, 2020, the disclosure of which is incorporated herein by reference in its entirety.

BACKGROUND

A suspended ceiling (also commonly called a drop ceiling) typically includes a plurality of ceiling panels that hang a few inches below a structural ceiling. The suspended ceiling does not make up a permanent structural foundation, but rather serves as a covering for the structural ceiling above. Suspended ceilings can be used in any desired location provided there is sufficient clearance space below the structural ceiling.

A typical suspended ceiling is formed from a gridwork of metallic channels having the cross-sectional shape of an upside-down "T", suspended on wires from the overhead structure. The channels are known to snap together to form a uniform and regularly spaced pattern of cells. Each cell is then filled with one or more ceiling panels (or "tiles"), which simply drop into the cells formed within the gridwork.

A suspended ceiling can have aesthetic advantages, as it covers up existing ceiling imperfections, beams and studs that would otherwise be exposed. In addition, the space between the structural ceiling and the suspended ceiling can also be used to run wires, cables, pipes, and ventilation systems discreetly throughout the building structure. In addition, the suspended ceiling easily facilitates access to hidden wires, cables, pipes, and ventilation systems when necessary, without needing to tear apart the ceiling or gain access to upper spaces within the building structure.

Conventional ceiling panels come in an infinite variety of textures and designs. Most ceiling panels are made from mineral fiber, but other materials are available, such as fiberglass-based materials. Mineral fiber ceiling panels can have a high Noise Reduction Coefficient (NRC), which means they are good at absorbing sound within a space to prevent echo or loud environments. In addition, some mineral based ceiling panels can have a high Ceiling Attenuation Class (CAC), meaning they prevent sound from passing through the ceiling to another space.

To provide aesthetic appeal, an exposed surface of conventional ceiling panels can have a wide variety of designs, including rough or smooth appearances. Ceiling panels can also have designs imprinted in them or other scored patterns.

It would be advantageous if ceiling panels could be improved.

SUMMARY

It should be appreciated that this Summary is provided to introduce a selection of concepts in a simplified form, the concepts being further described below in the Detailed Description. This Summary is not intended to identify key features or essential features of this disclosure, nor it is intended to limit the scope of the ceiling panel for suspended ceilings.

The above objects as well as other objects not specifically enumerated are achieved by a ceiling panel for use in a gridwork of a suspended ceiling. The ceiling panel includes a layer of foam insulation. A first facing sheet is positioned on a lower major face of the layer of foam insulation and a second facing sheet is positioned on an upper major face of the layer of foam insulation. A surface covering layer is positioned on an exposed face of the first facing sheet.

Various objects and advantages of the ceiling panel for suspended ceilings will become apparent to those skilled in the art from the following Detailed Description, when read in light of the accompanying drawings.

DETAILED DESCRIPTION

The ceiling panel for suspended ceilings will now be described with occasional reference to specific embodiments. The ceiling panel for suspended ceilings may, however, be embodied in different forms and should not be construed as limited to the embodiments set forth herein. Rather, these embodiments are provided so that this disclosure will be thorough and complete, and will fully convey the scope of the ceiling panel for suspended ceilings to those skilled in the art.

Unless otherwise defined, all technical and scientific terms used herein have the same meaning as commonly understood by one of ordinary skill in the art to which the ceiling panel for suspended ceilings belongs. The terminology used in the description of the ceiling panel for suspended ceilings herein is for describing particular embodiments only and is not intended to be limiting of the ceiling panel for suspended ceilings. As used in the description of the ceiling panel for suspended ceilings and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the ceiling panel for suspended ceilings. Notwithstanding that the numerical ranges and parameters setting forth the broad scope of the ceiling panel for suspended ceilings are approximations, the numerical values set forth in the specific examples are reported as precisely as possible. Any numerical values, however, inherently contain certain errors necessarily resulting from error found in their respective measurements.

A novel ceiling panel for suspended ceilings is disclosed. The novel ceiling panel is configured for use with a conventional suspended ceiling gridwork. Generally, the novel ceiling panel is formed from laminated layers including insulative foam and one or more covering layers.

The term "ceiling panel", as used herein, is defined to mean any structure used within a suspended ceiling gridwork. The term "suspended ceiling", as used herein, is defined to mean any structure utilizing a gridwork that is positioned below a structural ceiling or structural floor. The term "gridwork", as used herein, is defined to mean any structure forming a uniform and regularly spaced pattern of cells, with each cell configured to receive one or more ceiling panels.

Figure 1:
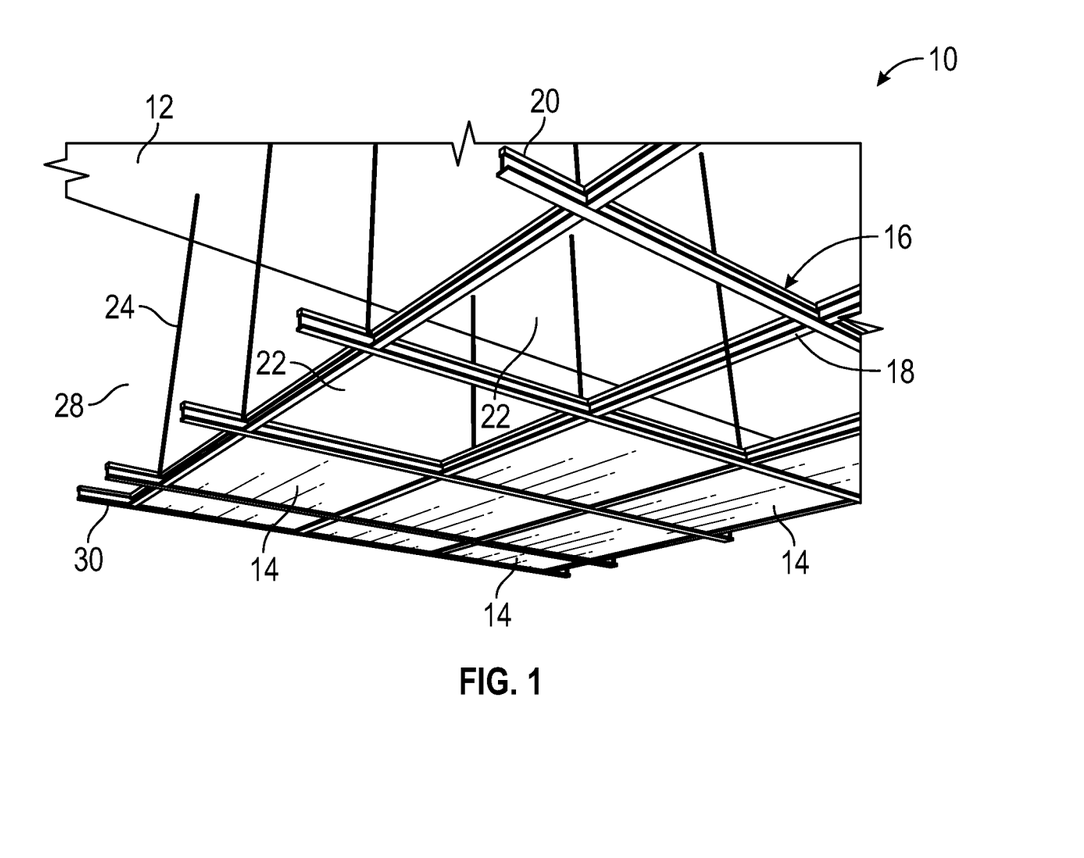
FIG. 1 is a perspective view of a portion of suspended ceiling incorporating novel ceiling panels in accordance with the invention.

Referring now to FIG. 1, a novel suspended ceiling is generally shown at 10. The novel suspended ceiling 10 is positioned below a conventional structural ceiling 12. Generally, the novel suspended ceiling 10 is formed from a plurality of novel ceiling panels 14, received and supported within a suspended ceiling gridwork 16. The suspended ceiling gridwork 16 is conventional in the art and will only be briefly described herein. The suspended ceiling gridwork 16 is formed with a plurality of main beam members 18 connected to a plurality of cross members 20. In the illustrated embodiment, the main beam members 18 and the cross members 20 have the cross-sectional shape of an inverted "T". However, in other embodiments, the main beam members 18 and the cross members 20 can have other cross-sectional shapes sufficient to receive and support the novel ceiling panels 14.

Referring again to embodiment illustrated in FIG. 1, the main beam members 18 and the cross members 20 are known to snap together to form a regularly spaced pattern of cells 22. In alternate embodiments, the main beam members 18 and the cross members 20 can be connected together with other structures, mechanisms and devices. In still other embodiments, the cells 22 can be formed with other structures, mechanisms and devices.

Referring again to FIG. 1, the suspended ceiling gridwork 16 hangs from a plurality of wires 24 connected to an overhead structure 26, such as for example, a structural ceiling or upper level flooring. The suspended ceiling gridwork 16 is connected to vertical structures, such as for example, walls 28 with edge molding members 30. It should be appreciated that in other embodiments, the suspended ceiling gridwork 16 can be attached and/or connected to other structures with other mechanisms and devices.

Figure 2:
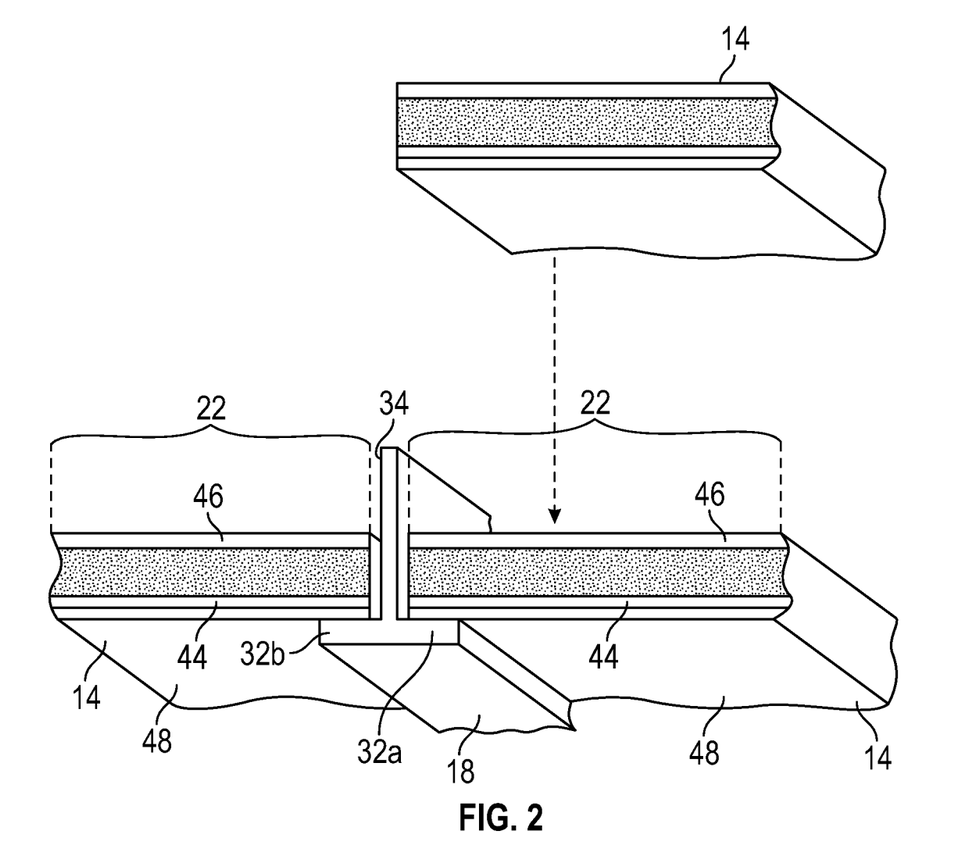
FIG. 2 is a perspective view of the portion of suspended ceiling of FIG. 1, illustrating placement of the novel ceiling panels within a gridwork.

Referring now to FIG. 2, the main beam member 18 is illustrated. The main beam member 18 has the cross-sectional shape of an inverted "T", thereby forming opposing legs 32a, 32b extending radially from a central member 34. Each of the opposing legs 32a, 32b is configured to support a novel ceiling panel 14. As is known in the art, once the suspended ceiling gridwork 16 is in place, formed by the main beam members 18 and the cross members (not shown for purposes of clarity), the resulting regularly spaced pattern of cells 22 are filled with the novel ceiling panels 14.

Figure 3:
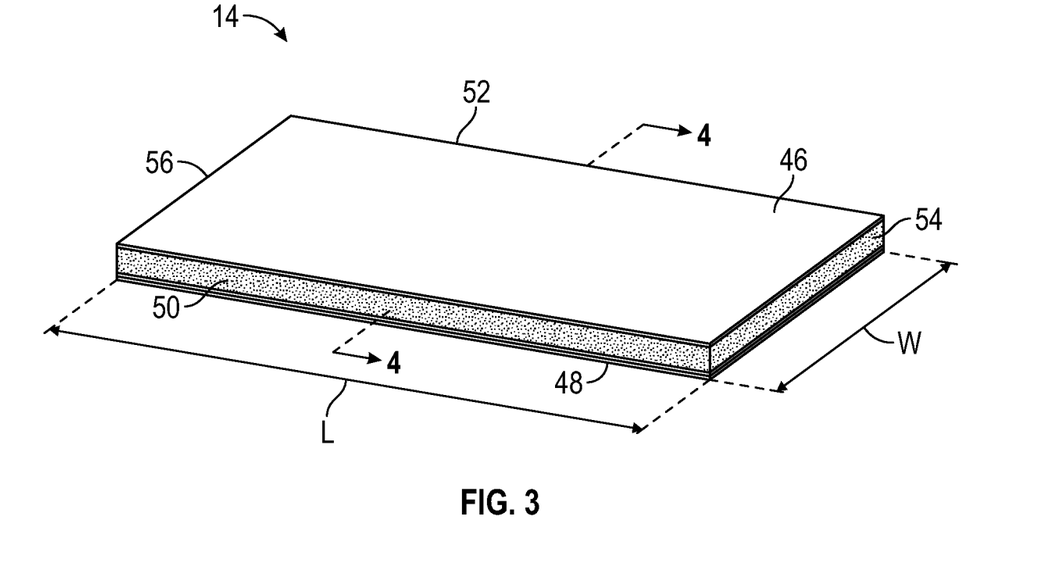
FIG. 3 is a perspective view of the novel ceiling panel of FIG. 1.
Figure 4:
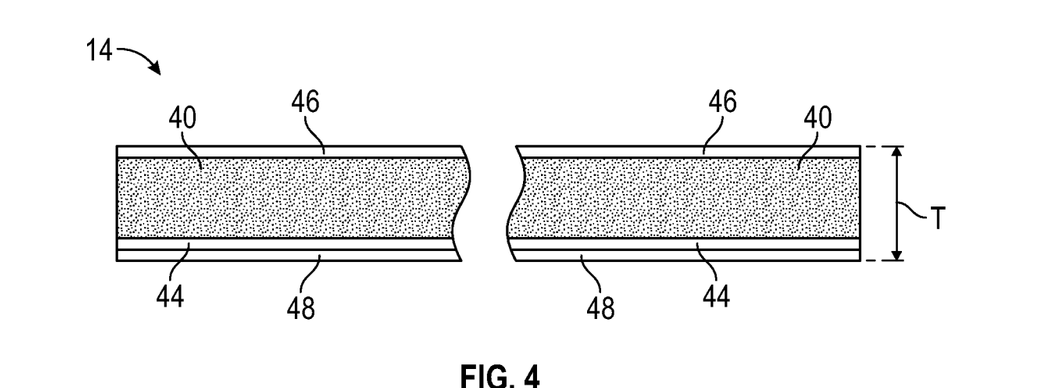
FIG. 4 is a side cross-sectional view of the novel ceiling panel of FIG. 2 illustrating a laminate construction.

Referring now to FIGS. 3 and 4, a first embodiment of the novel ceiling panel 14 is illustrated. The ceiling panel 14 is configured for insertion into a cell 22 formed by the suspended ceiling gridwork 16 and is further configured for support by the suspended ceiling gridwork 16. Generally, the novel ceiling panel 14 is a laminate structure comprising more than one layer of material. The ceiling panel 14 comprises a layer of foam insulation 40, bounded by optional and opposing facing sheets 44, 46 and a surface covering layer 48 formed over one of the optional facing sheets 44, 46.

Referring again to FIGS. 3 and 4, excellent results have been obtained where the layer of foam insulation 40 is one that is available from Kingspan under the trademark Kool-Duct®. It is a rigid phenolic insulation panel that has a rigid phenolic insulation core with zero Ozone Depletion Potential (ODP), autohesively bonded on both sides to a 0.001 inch thick low vapor permeability aluminum foil facing reinforced with a 0.2 inch glass scrim. KoolDuct® has a high R-value, excellent fire and heat resistance properties, and it is a closed cell foam. In certain instances, KoolDuct® can be distributed with foil facing layers, however such is not necessary. While the layer of foam insulation 40 has been described above as being formed from KoolDuct®, it should be appreciated that other suitable foam insulation structures can be used.

Referring again to FIGS. 3 and 4, the optional facing sheets 44, 46 are configured to block radiant heat, prevent the penetration of air into the foam insulation 40 and prevent the intrusion of moisture in the foam insulation 40. In the illustrated embodiment, the optional facing sheets 44, 46 are formed from scrimmed aluminum foil and positioned on opposing upper and lower major faces of the foam insulation 40. However, it should be appreciated that in other embodiments, the optional facing sheets 44, 46 can have other forms sufficient to block radiant heat, prevent the penetration of air into the foam insulation 40 and prevent the intrusion of moisture in the foam insulation 40. While the embodiment shown in FIGS. 3 and 4 illustrates opposing facing sheets 44, 46, it should be appreciated that in other embodiments, a lone facing sheet positioned on one side of the foam insulation 40 can be used. It is also contemplated that each of the opposing facing sheets 44, 46 can be formed from different materials and can have different forms. Non-limiting examples of different materials include glass mat tissue and other fire resistant materials. It should further be appreciated that the facing sheets 44, 46 are optional and are not required for successful operation of the novel ceiling panel 14.

Referring again to FIGS. 3 and 4, the optional facing sheets 44, 46 are securely bonded to the foam insulation panel 40. In certain instances, adhesive systems such as the non-limiting example of polyurethane-based adhesive systems are used to bond the optional facing sheets 44, 46 to the foam insulation panel 40. In other embodiments, other adhesive systems can be used. It is also contemplated that the optional facing sheets 44, 46 can have bonding properties that eliminate the need for separate and distinct adhesive systems. In any case, a strong and secure bond is required between the optional facing sheets 44, 46 and the foam insulation panel 40.

Referring again to FIGS. 3 and 4, the surface covering layer 48 can be formed from any desired material, such as the non-limiting examples of mineral fibers, fiberglass or fiberglass-based composites, ceramic-based materials, plaster, polymers or combinations thereof and having any desired visual appearance, effects, shapes, indentations, patterns, textures and the like. In an installed orientation, the surface covering layer 48 will be facing an active space of the facility and the optional facing sheet 46 will be facing away from the active space of the facility. Accordingly, the material and finish selected for the surface covering layer 48 should be selected for this type of orientation. In certain instances, the surface covering layer 48 can contain additives and/or coatings to provide desired physical and/or aesthetic characteristics. As one non-limiting example, a fire-retardant coating may be applied to the exposed surface of the surface covering layer 48 to provide desired fire-retardant properties.

Referring now to FIG. 4, the surface covering layer 48 may have any one of a range of thicknesses. In certain instances, the thickness can be in a range of from about 20.0 microns to about 2000.0 microns. A thickness of about 1000.0 microns is suitable for use with the layer of foam insulation 40 specifically disclosed and described above.

Referring again to FIGS. 3 and 4, the surface covering layer 48 is securely bonded to the optional facing sheet 46 or the foam insulation panel 40. In certain instances, adhesive systems including the non-limiting example of polyurethane-based adhesive systems are used to bond the surface covering layer 48 to the optional facing sheet 46. However, in other instances, other adhesive systems can be used, sufficient to bond the surface covering layer 48 to the optional facing sheet 46. In any case, a strong and secure bond is required between the surface covering layer 48 and the optional facing sheet 46 or the foam insulation panel 40.

Referring again to FIGS. 3 and 4, the novel ceiling panel 14 has a length L, a width W and a thickness T. The combination of the length L and the width W are configured for insertion and support by a cell 22 of the suspended ceiling gridwork 16. Typically, the length L is in a range of from about 12.0 inches to about 96.0 inches and the width W is in a range of from about 12.0 inches to about 48.0 inches, however other lengths L and widths W can be used.

Referring now to FIG. 4, the thickness T is configured for desired insulative R-value, flame spread rating in compliance with Underwriters Laboratories (UL) Test No. 723, fire barrier ratings in compliance with ASTM Test No. E-119, and low Noise Reduction Coefficient (NRC) as commonly determined through use of standardized testing procedures, such as ASTM C423. UL Test No. 723 is a test for surface burning characteristics of building materials and is typically used to determine the relative surface burning characteristics of materials used as coverings for walls and ceilings. A good rating (Class A or Class 1) in this test means the material is almost entirely non-flammable (doesn't burn easily). A bad rating means the material is highly flammable, and should not be used as an interior finish or building component. ASTM Test No. E-119 evaluates the duration for which building elements contain a fire, retain their structural integrity, or exhibit both properties during a predetermined test exposure. The test exposes a specimen to a standard fire controlled to achieve specified temperatures throughout a specified time period. In the illustrated embodiment, the thickness T is sufficient to provide a Class A rating for flame spread and fire barrio properties. ASTM C423 is a standard test method for sound absorption and sound absorption coefficients as determined by the reverberation room method. This test method covers the measurement of sound absorption in a reverberation room by measuring decay rate. Procedures for measuring the absorption of a room, the absorption of an object, such as an office screen, and the sound absorption coefficients of a specimen of sound absorptive material, such as acoustical ceiling tile, are provided. In the illustrated embodiment, the thickness T is sufficient to provide a Noise Reduction Coefficient (NRC) of at least 0.70. In the illustrated embodiment, the thickness T is in a range of from about 0.50 inches to about 3.0 inches. However, in other embodiments, the thickness T can be less than about 0.50 inches or more than about 3.0 inches, sufficient to provide the desired insulative R-value, surface burning and flame spread fire ratings and acoustic properties.

Referring now to FIG. 3, the ceiling panel 14 has a first major edge 50, an opposing second major edge 52, a first minor edge 54 and an opposing second minor edge 56. Each of the edges 50, 52, 54 and 56 can have edge profile that is configured for specific aesthetic presentation.

Figure 5A:
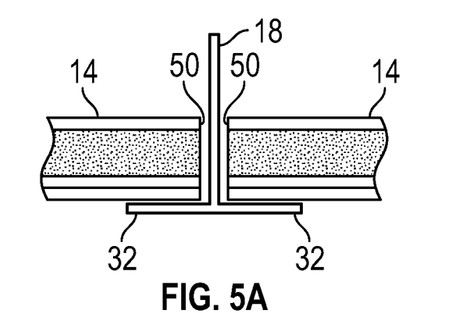
FIG. 5A is a side cross-sectional view of the novel ceiling panel of FIG. 2 illustrating a first embodiment of an edge profile.

Referring now to FIG. 5A, novel ceiling panels 14 and a main beam member 18 are illustrated. The novel ceiling panels 14 have a first major edge 50 incorporating a first aesthetic presentation (the second major edge 52, first minor edge 54 and second minor edges 56 are not shown for purposes of clarity). The first major edge 50 is representative of the second major edge 52, first minor edge 54 and second minor edge 56. The first major edge 50 has a generally square profile. The square edge profile of the edges 50, 52, 54, 56 advantageously are hidden by the legs 32 of the main beam member 18 and the cross member (not shown), thereby providing a certain desired aesthetic presentation.

Figure 5B:
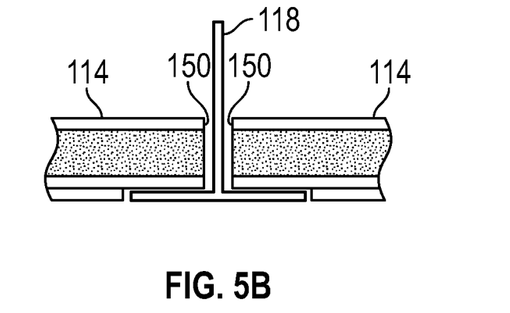
FIG. 5B is a side cross-sectional view of the novel ceiling panel of FIG. 2 illustrating a second embodiment of an edge profile.

Referring now to FIG. 5B, novel ceiling panels 114 and a main beam member 118 are illustrated in a second aesthetic presentation. In this aesthetic presentation, the major and minor edges (only edge 150 is shown for purposes of clarity) of the novel ceiling panels 114 have a tegular profile. The tegular edge profile of the edges advantageously facilitate hanging of a portion of the ceiling panels 114 below an exposed portion of the main beam member 118 and the cross member (not shown), thereby providing a certain desired aesthetic presentation.

Figure 5C:
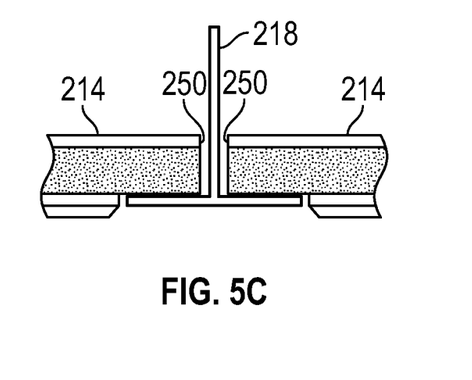
FIG. 5C is a side cross-sectional view of the novel ceiling panel of FIG. 2 illustrating a third embodiment of an edge profile.

Referring now to FIG. 5C, novel ceiling panels 214 and a main beam member 218 are illustrated in a third aesthetic presentation. In this aesthetic presentation, the major and minor edges (only edge 250 is shown for purposes of clarity) of the novel ceiling panels 214 have a beveled, tegular profile. The beveled, tegular edge profile of the edges advantageously facilitate hanging of a portion of the ceiling panels 114 below an exposed portion of the main beam member 118 and the cross member (not shown), thereby providing yet another desired aesthetic presentation.

Figure 5D:
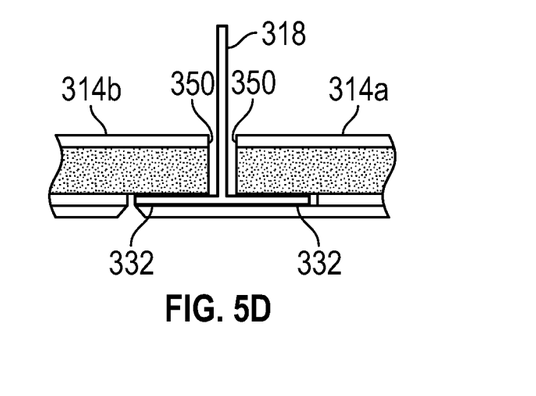
FIG. 5D is a side cross-sectional view of the novel ceiling panel of FIG. 2 illustrating a fourth embodiment of an edge profile.

Referring now to FIG. 5D, novel ceiling panels 314a, 314b and a main beam member 318 are illustrated in a fourth aesthetic presentation. In this aesthetic presentation, the major and minor edges (only edge 350 is shown for purposes of clarity) of the adjacent novel ceiling panels 314a, 314b have a concealed "T" edge profile (also commonly called a shiplap edge profile) that facilitates hiding of the legs 332 of the main beam member 318 within portions of the novel ceiling panel 314a.

The novel ceiling panels 14, 114, 214, 314a and 314b provide many unexpected benefits, although all benefits may not be provided in all embodiments. First, the laminate structure of the ceiling panel, including the layer of layer of foam insulation 40, the optional facing sheets 44, 46 and the surface covering layer 48 can be configured to provide high R-value insulation. Second, the laminate structure of the ceiling panel can be configured to provide UL compliance for flame spread, particularly Underwriters Laboratories (UL) Test No. 723. Third, the laminate structure of the ceiling panel can be configured to provide ASTM compliance for fire barrier rating, particularly ASTM Test No. E-119. Fourth, the laminate structure of the ceiling panel provides a lightweight ceiling panel, thereby minimizing the structural requirements of the suspended ceiling gridwork 16. Fifth, the laminate structure of the ceiling panel can be configured to provide a low Noise Reduction Coefficient (NRC) as commonly determined through use of standardized testing procedures, such as ASTM C423.

Figure 6:
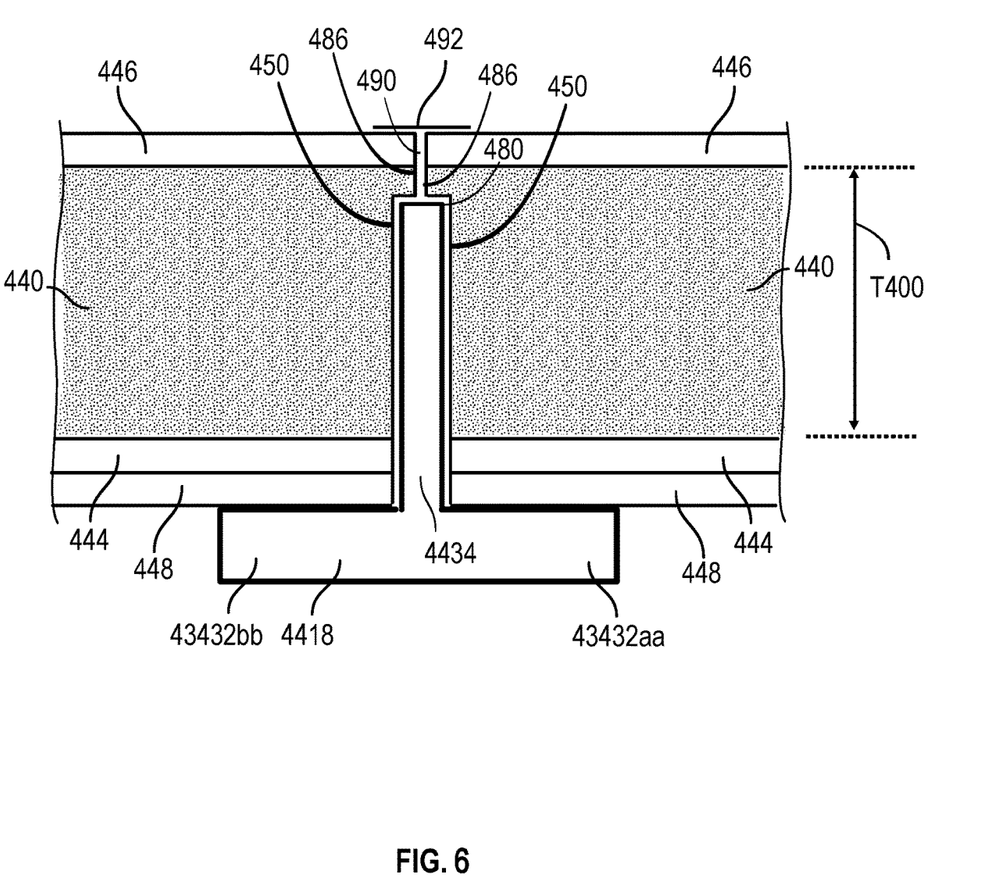
FIG. 6 is a cross-sectional view of a plurality of the novel ceiling panels of FIG. 2, illustrating adjacent panels forming overlapping or abutting joints.

While the novel ceiling panels 14, 114, 214 and 314 illustrated in FIGS. 5A-5D provide various aesthetic presentations, it should be appreciated that in other embodiments, the ceiling panels can have other forms, structures and/or cross sectional shapes to provide other desired characteristics. Referring now to FIG. 6, another embodiment of a novel ceiling panel arrangement is illustrated. The novel ceiling panel arrangement includes a main beam member 418. The main beam member 418 has the same, or similar, inverted "T" cross-sectional shape as the main beam member 18, illustrated in FIG. 2. The main beam member 418 includes opposing legs 432a, 432b extending radially from a central member 434. An outward end 480 of the central member 434 extends from the opposing legs 432a, 432b.

Referring again to FIG. 6, opposing novel ceiling panels 414a, 414b are supported by the opposing legs 432a, 432b of the main beam member 418 as described above. Each of the novel ceiling panels 414a, 414b includes opposing, optional facing sheets 444, 446 securely bonded to a foam insulation panel 440. Each of the novel ceiling panels 414a, 414b also includes a surface covering layer 448 bonded to the facing sheet 444. In the illustrated embodiment, the opposing, optional facing sheets 444, 446 and the surface covering layer 448 are same as, or similar to, the opposing, optional facing sheets 44, 46 and the surface covering layer 48 described above and shown in FIG. 4. However, in other embodiments, the opposing, optional facing sheets 444, 446 and the surface covering layer 448 can be different from the opposing, optional facing sheets 44, 46 and the surface covering layer 48.

Referring again to the embodiment shown in FIG. 6, the foam insulation panel 440 has a thickness T400 sufficient to extend the facing sheets 446 of each of the novel ceiling panels 414a, 414b above the outward end 480 of the central member 434. With this arrangement, a first major edge 450 of each of the novel ceiling panels 414a, 414b has a generally square profile and abuts the central member 434 as described above. A second edge 486 of each of the novel ceiling panels 414a, 414b is positioned vertically above the first major edge 450 and atop the outward end 480 of the central member 434. The second edge 486 of each of the novel ceiling panels 414a, 414b has a generally square profile, and the opposing second edges 486 form a butt-style joint. However, it should be appreciated that in other embodiments, the adjoining novel ceiling panels 414a, 414b can form other types of joints, including the non-limiting example of a shiplap joint.

Referring again to FIG. 6, a gap 490 is formed between the second edges 486 of the adjoining novel ceiling panels 414a, 414b. In certain embodiments, the gap 490 can be enclosed by a sealing strip 492 that bridges the gap 490 and attached to the adjoining novel ceiling panels 414a, 414b. In the illustrated embodiment, the sealing strip 492 has the form of an insulated adhesive tape. However, in other embodiments, the sealing strip 492 can have other suitable forms, including the non-limiting example of a thermoelastic polymer.

Referring again to FIG. 6, the adjoining novel ceiling panels 414a, 414b provide several advantages. First, the portion of the foam insulation panel 440 that extends above the outward end 480 of the central member 434 advantageously extends the insulative effect of the novel ceiling panels 414a, 414b to all areas of the suspended ceiling, including those areas directly above the main beam member 418. Second, the increased thickness of the foam insulation panel 440 advantageously increases the high R-value of the suspended ceiling. Third, the adjoining structure of the novel ceiling panels 414a, 414b can be configured to increase UL compliance for flame spread, particularly Underwriters Laboratories (UL) Test No. 723. Finally, the adjoining structure of the novel ceiling panels 414a, 414b can be configured to increase ASTM compliance for fire barrier rating, particularly ASTM Test No. E-119.

While FIGS. 5A-5D provide non-limiting examples of ceiling panel edge profiles, it should be appreciated that other desired profiles can be provided to provide other desired aesthetic presentations.

In accordance with the provisions of the patent statutes, the principle and mode of operation of the ceiling panel for suspended ceilings have been explained and illustrated in certain embodiments. However, it must be understood that the ceiling panel for suspended ceilings may be practiced otherwise than as specifically explained and illustrated without departing from its spirit or scope.

What is claimed is:

1. A suspended ceiling, comprising:
   a plurality of ceiling panels,
   a suspended ceiling gridwork comprising a plurality of main beam members connected to a plurality of cross members to form a uniform and regularly spaced pattern of cells wherein each cell is filled with a ceiling panel;
   the ceiling panel comprising:
      a layer of foam insulation;
      a first facing sheet positioned on a lower major face of the layer of foam insulation, the first facing sheet formed from a scrimmed metallic material;
      a second facing sheet positioned on an upper major face of the layer of foam insulation, the second facing sheet having a major surface that is exposed to a space of a facility and formed from a scrimmed metallic material;
      a surface covering layer formed from a material selected from the group consisting of mineral fibers, fiberglass or fiberglass-based composites, ceramic-based materials, plaster, polymers or combinations thereof, wherein the surface covering layer is bonded on an exposed face of the first facing sheet, the surface covering layer having a major surface that is exposed to an active space of the facility,
      wherein the foam insulation layer, first facing sheet, second facing sheet and surface covering layer are co-extensive with each other, and each of the layers having a planar orientation and an uninterrupted form extending from a first major edge to an opposing second major edge and extending from a first minor edge to an opposing second minor edge.

2. The suspended ceiling of claim 1, wherein the layer of foam insulation is formed from rigid, closed-cell, phenolic-based materials.

3. The suspended ceiling of claim 2, wherein the rigid, closed-cell, phenolic-based material has zero Ozone Depletion Potential (ODP).

4. The suspended ceiling of claim 1, wherein the first facing sheet material is bonded to the layer of foam insulation with a polyurethane adhesive system.

5. The suspended ceiling of claim 1, wherein the first facing sheet material is formed from a scrimmed aluminum foil material.

6. The suspended ceiling of claim 5, wherein the scrimmed aluminum foil material has a thickness of 0.001 inches.

7. The suspended ceiling of claim 5, wherein the scrimmed aluminum foil material is reinforced with a layer of glass scrim.

8. The suspended ceiling of claim 1, wherein the second facing sheet material is bonded to the layer of foam insulation with a polyurethane adhesive system.

9. The suspended ceiling of claim 1, wherein the second facing sheet material is formed from a scrimmed aluminum foil material.

10. The suspended ceiling of claim 9, wherein the scrimmed aluminum foil material has a thickness of 1 mil.

11. The suspended ceiling of claim 9, wherein the scrimmed aluminum foil material is reinforced with a layer of glass scrim.

12. The suspended ceiling of claim 1, wherein the surface covering layer further includes a fire-retardant coating configured to provide desired fire-retardant properties.

13. The suspended ceiling of claim 1, wherein the surface covering layer further includes a sound deadening coating configured to absorb sound.

14. The suspended ceiling of claim 1, wherein the surface covering layer has a thickness in a range of from about 20.0 microns to about 2000.0 microns.

15. The suspended ceiling of claim 1, wherein the main beam members has a cross-sectional shape of an inverted "T" forming opposing legs extending radially from a central member.

16. The suspended ceiling of claim 1, wherein the ceiling panel has opposing first and second major edges and opposing first and second minor edges, and wherein the first and second major and minor edges have a tegular edge profile.

17. The suspended ceiling of claim 16, wherein the first and second major and minor edges have a concealed "T" edge profile.

* * * * *